Dec. 21, 1965  SHOZO UCHIDA  3,225,275

GANGED VARIABLE CAPACITORS

Filed Dec. 1, 1964

INVENTOR.
Shozo Uchida

BY
H. Edward Mierins

United States Patent Office 3,225,275
Patented Dec. 21, 1965

1

3,225,275
GANGED VARIABLE CAPACITORS
Shozo Uchida, Kawagoe-shi, Japan, assignor to Toko Kabushiki Kaisha, Ota-ku, Tokyo-to, Japan, a joint-stock company of Japan
Filed Dec. 1, 1964, Ser. No. 415,059
Claims priority, application Japan, Dec. 9, 1963, 38/92,008
3 Claims. (Cl. 317—249)

This invention relates to a new and improved ganged variable capacitor assembly for use in radio receiving sets.

One type of prior ganged variable capacitors comprises a stationary ceramic plate or disc integral with a stator and a rotor made of a suitable insulator in sliding engagement with one surface of the ceramic plate. The electrode on the rotor side is provided on the inner surface of the rotor facing the ceramic plate, while the electrode on the stator side is provided on the opposite side of the ceramic plate. In order to provide such ganged variable capacitors, one of the electrodes comprises a pair of electrically isolated, concentric, semicircular electrode segments of different radii disposed on the opposite regions with respect to a transverse center line perpendicular to the axis of rotation of the rotor. However, when utilizing such ganged variable capacitors for high frequency applications, it has been found that there is mutual interference between said concentric semicircular electrode segments owing to stray capacitance between them.

It is an object of this invention to eliminate such mutual interference by simple means.

Another object of this invention is to provide improved ganged variable capacitors wherein the effect of stray capacitance between isolated electrode segments comprising one of the electrodes can be eliminated by the shielding action of the other electrode.

These and other features of the invention will become more apparent from consideration of the following detailed description taken in conjunction with the accompanying drawing in which like parts are designated by like reference numerals, and in which.

Figure 1:
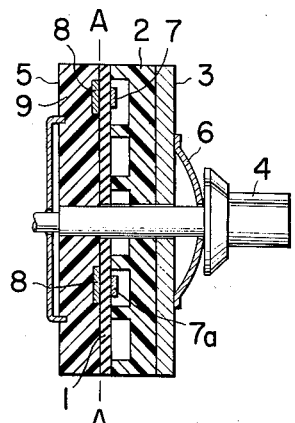
FIG. 1 is a sectional view of a ceramic variable capacitor embodying this invention wherein the relation between the stator and the rotor is clearly indicated.

Referring now to the accompanying drawings, in FIG. 1 is shown an example of a ceramic variable capacitor constructed in accordance with the principle of this invention, which comprises a stator of unitary construction including a ceramic plate 1, a resilient support 2 therefor and a retaining plate 3, and a rotor 5 which is securely mounted on a rotary shaft 4 and is urged against the surface A of the ceramic plate 1 by means of a spring 6. Electrodes 7 and 7a on the stator side are deposited on the rear surface of the ceramic plate, whereas the electrode 8 on the rotor side is secured to an insulator 9 such as synthetic resin and the like.

Either of the stator electrode and the rotor electrode may be grounded, but for the sake of brevity it is assumed in the following description that the rotor electrode is grounded.

Figure 2:
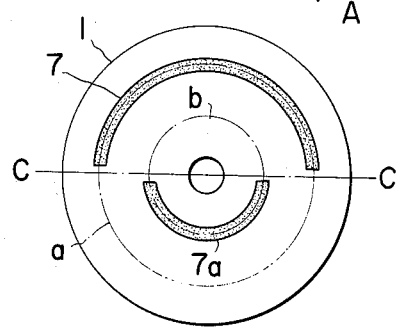
FIGS. 2 and 3 are planar views showing a stator electrode and a rotor electrode, respectively.

It is already known in the art to provide two electrodes 7 and 7a on the same surface of the ceramic plate 1, as shown in FIG. 2, in order to provide ganged variable capacitors, but in such construction there is the problem of resulting mutual interference owing to stray capacitance between electrodes 7 and 7a.

Although this problem has been solved by interposing an additional auxiliary electrode for shielding electrodes 7 and 7a from each other or by positioning these electrodes as far as possible on the opposite sides of the center line C, as illustrated in FIG. 2, this invention contemplates the provision of effective shielding action between electrodes 7 and 7a by utilizing an electrode on the rotor side.

In this invention the electrodes 7 and 7a on the stator side are also disposed substantially along two concentric circles a and b of different radii in the regions on the opposite sides of the center line C. On the other hand, the electrode 8 on the rotor side is comprised of two semicircular sections 8a and 8b of different radii which are substantially corresponding to the electrodes 7 and 7a on the stator side, and it is an essential feature of this invention to electrically interconnect corresponding ends of these sections 8$_a$ and 8$_b$ by a conductor strip 8$_c$, as shown in FIG. 3.

Figure 4:
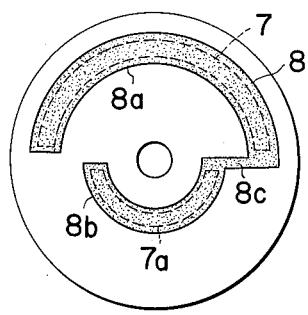
FIGS. 4 and 5 are planar views illustrating states of overlap between rotor and stator electrodes, wherein FIG. 4 corresponds to the maximum capacitance, and FIG. 5 the minimum capacitance.
Figure 5:
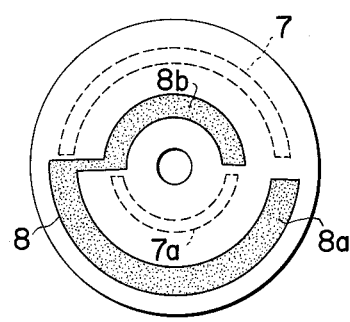

FIGS. 4 and 5 illustrate different degrees of overlap between the stator electrode and rotor electrode. More particularly, FIG. 4 corresponds to the maximum capacitance, while FIG. 5 corresponds to minimum capacitance. In the latter state it will be clearly observed that electrodes 7 and 7$_a$ are nearly completely shield from each other by the rotor electrode 8.

Thus, with the ganged variable capacitors constructed in accordance with this invention, the mutual interference between electrodes 7 and 7$_a$ on the antenna side and oscillator side, respectively, can be prevented by the shielding action provided by the rotor electrode 8 as the capacitance is decreased.

Figure 3:
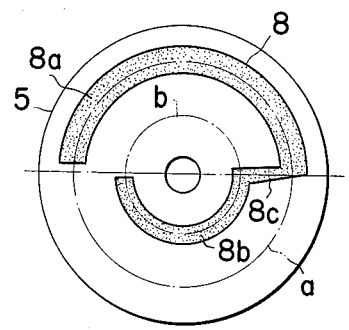

Although the above description has been made on the assumption that electrodes on the stator are grounded, it will be clear that the electrodes shown in FIG. 2 may be provided on the rotor side, and that those shown in FIG. 3 may be provided on the stator side.

While the invention has been described with reference to a preferred embodiment thereof it should be understood that many modifications may be made therein without departing from the true spirit and scope of the invention as defined in the appended claims.

What I claim is:

1. Ganged variable capacitors comprising a rotor, a stator, a ceramic plate sandwiched between said rotor and stator, an electrode on said rotor and an electrode on said stator, either one of said electrodes comprising a first pair of concentric semicircular segments of different radii disposed in the regions on opposite sides of a lateral diametrical center line, the other of said electrodes comprising a corresponding second pair of concentric semicircular segments of different radii, and said second pair of semicircular electrode segments being electrically interconnected and grounded to provide complete electrostatic shielding of said first pair of semicircular electrode segments.

2. The ganged variable capacitors according to claim 1 wherein said grounded pair of semicircular electrode segments are electrically interconnected at their corresponding ends near said lateral diametrical center line.

3. The ganged variable capacitors according to claim 1 wherein said rotor, stator and ceramic plate are all in the form of circular discs, one of said electrodes is provided on the inner surface of said rotor facing toward said ceramic plate, and the other of said electrodes is provided on the opposite side of said ceramic disc.

References Cited by the Examiner
UNITED STATES PATENTS 2,913,644  11/1959  Bleazy _____ 317—249
2,913,645  11/1959  Hansen et al. _____ 317—249

FOREIGN PATENTS 882,405   11/1961  Great Britain.
1,005,189  3/1957  Germany.

ROBERT K. SCHAEFER, *Primary Examiner.*
JOHN F. BURNS, *Examiner.*
D. JAMES BADER, *Assistant Examiner.*